(12) United States Patent
Trent et al.

(10) Patent No.: US 8,399,756 B1
(45) Date of Patent: Mar. 19, 2013

(54) GUITAR STRIP

(76) Inventors: John Trent, Ojai, CA (US); Daniel Callaghan, Ventura, CA (US)

( * ) Notice: Subject to any disclaimer, the term of this patent is extended or adjusted under 35 U.S.C. 154(b) by 0 days.

(21) Appl. No.: 13/253,781

(22) Filed: Oct. 5, 2011

(51) Int. Cl.
*G09B 15/06* (2006.01)
*G10D 3/06* (2006.01)

(52) U.S. Cl. .................................... 84/485 R; 84/314 R

(58) Field of Classification Search ............... 84/485 R, 84/314 R
See application file for complete search history.

(56) References Cited

U.S. PATENT DOCUMENTS

| | | | | |
|---|---|---|---|---|
| 346,424 A * | 7/1886 | Burton | ......................... | 84/314 R |
| 357,168 A * | 2/1887 | Barnwell | ..................... | 84/314 R |
| 494,698 A * | 4/1893 | Zorger | ........................ | 84/314 R |
| 656,917 A * | 8/1900 | Wight | ......................... | 84/314 R |
| 826,379 A * | 7/1906 | Sprotte | ....................... | 84/314 R |
| 852,407 A * | 4/1907 | Galbraith | .................... | 84/314 R |
| 1,126,957 A * | 2/1915 | Consoli | ...................... | 84/314 R |
| 1,991,864 A * | 2/1935 | Nopola et al. | .............. | 84/477 R |
| 3,403,590 A * | 10/1968 | Quinton | ....................... | 84/470 R |
| 3,978,756 A * | 9/1976 | Feldman | ..................... | 84/470 R |
| 4,286,495 A * | 9/1981 | Roof | ............................ | 84/485 R |
| 4,291,606 A * | 9/1981 | Lepage | ............................ | 84/291 |
| D275,686 S * | 9/1984 | Beasley | .......................... | D17/20 |
| 4,807,509 A * | 2/1989 | Graham | ...................... | 84/314 R |
| 5,373,768 A * | 12/1994 | Sciortino | ........................ | 84/293 |
| 5,920,023 A * | 7/1999 | Ravagni et al. | ............. | 84/485 R |
| 5,977,462 A * | 11/1999 | Wolfson | ........................ | 84/267 |
| 6,218,603 B1 * | 4/2001 | Coonce | ...................... | 84/485 R |
| 6,452,081 B1 * | 9/2002 | Ravagni et al. | ............. | 84/477 R |
| 6,984,780 B2 * | 1/2006 | Reierson | ..................... | 84/314 R |
| 7,408,105 B2 * | 8/2008 | Murdock | .................... | 84/477 R |
| 7,427,704 B2 * | 9/2008 | Huwaldt | ..................... | 84/314 R |
| 7,767,894 B1 * | 8/2010 | Diakoulas | .................. | 84/477 R |
| 2006/0272472 A1 * | 12/2006 | Lacelle et al. | ............. | 84/314 R |
| 2009/0266223 A1 * | 10/2009 | Tashima | ..................... | 84/485 R |

* cited by examiner

*Primary Examiner* — David Warren
*Assistant Examiner* — Robert W Horn
(74) *Attorney, Agent, or Firm* — Mark Rodgers

(57) ABSTRACT

A system for aiding in the teaching and playing of stringed instruments, allowing for easily understood, non-descript reference points. The system is a decal or series of decals or other printed thin attachable strips, depicting the notes on a given string corresponding to given fingering position. The decals are placed on the back of the neck near the top, or nut, allowing the player a clear view of the notes from a natural playing position, rather than having to look at the front of the fingerboard as in current systems. In a particular embodiment the printed notes correspond to the fret positions on a fretted instrument such as a guitar, or bass.

9 Claims, 5 Drawing Sheets

GUITAR STRIP

RELATED APPLICATIONS

Not Applicable

FEDERALLY SPONSORED RESEARCH

Not Applicable

SEQUENCE LISTING

Not Applicable

BACKGROUND OF THE INVENTION

This invention relates to aiding in the teaching and playing of stringed instruments, and is particularly applicable to fretted instruments such as guitar and electric bass In general, one of the more difficult aspects of playing stringed instruments is learning the fingering positions for the notes on the fingerboard. An electric six-string guitar for example has 6 strings each with up to 22 or more finger positions (frets) leading to up to 132 or more notes. The only way to learn the notes on the fretboard is memorization through practice. Clearly this learning task is a block to mastering these instruments Although all stringed instruments present this problem to beginning players, fretted instruments and particularly guitar and fretted bass, have particular aspects to their playing and intended use that are unique. Non-fretted instruments, such as violin, cello and string bass, for better or for worse usually are taught in the context of learning complex music over a period of years. In general the study of these instruments is a very serious endeavor. Moreover, the playing position of these instruments is such that the player is looking directly at the top of the fingerboard in standard playing positions.

Conversely, when learning to play guitar, or bass many people simply want to play their favorite songs, often in groups with pairings of bass and guitar. Most beginning guitar teaching techniques focus on learning open chords, which are more often used in acoustic guitar playing. Most rock songs are played with an electric guitar, so learning acoustic guitar techniques first might discourage some players. The acoustic guitar can be harder to play due to heavier strings and wider necks. The electric guitar is generally much easier to play. The strings are lighter, and easier to press down, the neck is typically smaller and can be manipulated with smaller hands. This can be particular important to younger players. Typical learning experiences often do not take advantage of the characteristics of electric guitars and can cause some to abandon the guitar learning process.

The quickest and easiest way to master many rock songs quickly is to learn Barre Chords and Power Chords. The most commonly played Barre Chords are the in the form of E and A chord variations. The majority of popular songs use Barre Chords and Power Chords in Standard Tuning. This is represented by E, A, D, G, B, E for a 6 string guitar, and by E, A, D, G for the Bass. See FIG. 5a. As can be seen, in standard tuning, when these chords are played up and down the fingerboard, the cord corresponds to the fret position on the $6^{th}$ and $5^{th}$ strings respectively, ie a barred E played on the $5^{th}$ fret is an A chord and a barred A played on the $5^{th}$ fret is a D. It is practical to play barre chords on most electric guitars well up to the $18^{th}$ fret or so. The other popular chords that use the $6^{th}$ and $5^{th}$ strings as a root, are Power Chords or the $5^{th}$ Chords. These chords are typically notated by the number 5, such as A5, G5 and so on. These Chords are a hybrid of a barred A Chord, and are popular in many Rock and Blues songs. These notes in particular are commonly played on the electric guitar vs the acoustic, because full chords are not always necessary on an electric. Sometimes with distortion it sounds better to play two or three note chords, vs full chords. Because these chords only require two or three notes, they are easier to play than a standard barred A, or E. Power Chords require less finger dexterity than barre A or E chords and they are extremely versatile. Because a Power Chord contains only 2 or 3 notes, it is considered both a major, and minor chord. Meaning songs with minor notations can be played with a power chord, vs changing fingering locations to accommodate the minor. See FIG. 5b Because it is easier to play both barre, and power chords on the electric guitar, learning barre chords and power chords, in standard tuning, is the fastest way to learn a complete chord repertoire. Thus learning three fingering patterns and a couple simple modifications such minor and $7^{th}$ variations, a beginning player can very quickly learn over a hundred chord positions. Even though using barre chords, and power chords cuts down on the fingering patterns needed, the player does need to know the root notes on the entire fingerboard. These chords require a root note to make it a chord. Root notes for these barre chords and power chords are most commonly found in the two lowest pitch strings, (top two strings) represented by the E and A. A simple system, particularly if it could be applied to both guitar and bass, that made it easy for beginners to know the notes on the fingerboard, particularly for the low pitch strings of the E and A., would be helpful to speed up the learning process, and allow beginning guitarists/bassists to communicate and play together the songs they know and like with minimal training.

Although fingerboard aids exist, they tend to fall into two categories. The first is decals or stickers on the fingerboard itself. These have two big disadvantages. First, the natural playing position of the Guitar does not lend itself well to looking down on the top of the fingerboard. Secondly installing such aids can require removing the strings. They are also visible from the front so an audience will see them, which is typically not desirable. Other aids exist in the form of marking on top of the rim or binding where the fingerboard meets the neck, but such systems, like the dot patterns found at selected frets, are intended as a reminder for experts and are too terse to be of much use for beginners. Thus it is the object of this invention to provide a learning/playing system that practically and easily allows for beginning players to play the notes and chords corresponding to the length of the fingerboard, in the playing position common for fretted instruments.

BRIEF SUMMARY OF THE INVENTION

The invention is a learning and playing system for stringed instruments having a neck and a fingerboard. The invention includes a thin flexible strip with characters representing musical notes printed on a surface of the strip, configured for semi-permanent placement along the length of the instruments neck opposite the fingerboard. The notes corresponding to at least two strings, starting from the lowest pitch string closest to the player (top of the fingerboard) and corresponding to at least one fingering position are printed on the surface, ordered with the note corresponding to the top string and the notes corresponding to successive strings substantially in a column. The strip is placed at the fingering position with the top note adjacent to the top of the neck and visible to the player from above and behind the fingerboard, providing a clear indication of the notes for at least the two lowest pitch strings at the fingering position.

In various embodiments, the invention includes notes printed on the strip continuously corresponding to a plurality of fingering positions, and installing the strip on the neck starting at the lowest fingering position of the plurality provides an indication of the notes at each fingering position of the plurality. In other embodiments, the invention is a plurality of individual strips corresponding to a plurality of fingering positions and installing the individual strips at the corresponding fingering positions provides an indication of the notes at each fingering position of the plurality. In a particular embodiment, the column of notes includes notes for all the strings on the instrument. In a preferred embodiment, the fingering positions correspond to the frets of a fretted instrument. In various embodiments the strip may be a decal attaching to the neck by least one of statically or low tack adhesive.

The invention applies to a variety of stringed instruments, including guitar, bass, ukulele, mandolin, and banjo.

The invention also is a method utilizing the note strip as a reference tool for the teaching of various musical skills including root notes, simple songs, 2-note power chords, three-note power chords, E-barre chords, A-barre chords, and scales.

BRIEF DESCRIPTION OF THE DRAWINGS

The invention will be better understood by referring to the following figures.

DETAILED DESCRIPTION OF THE INVENTION

Figure 1:
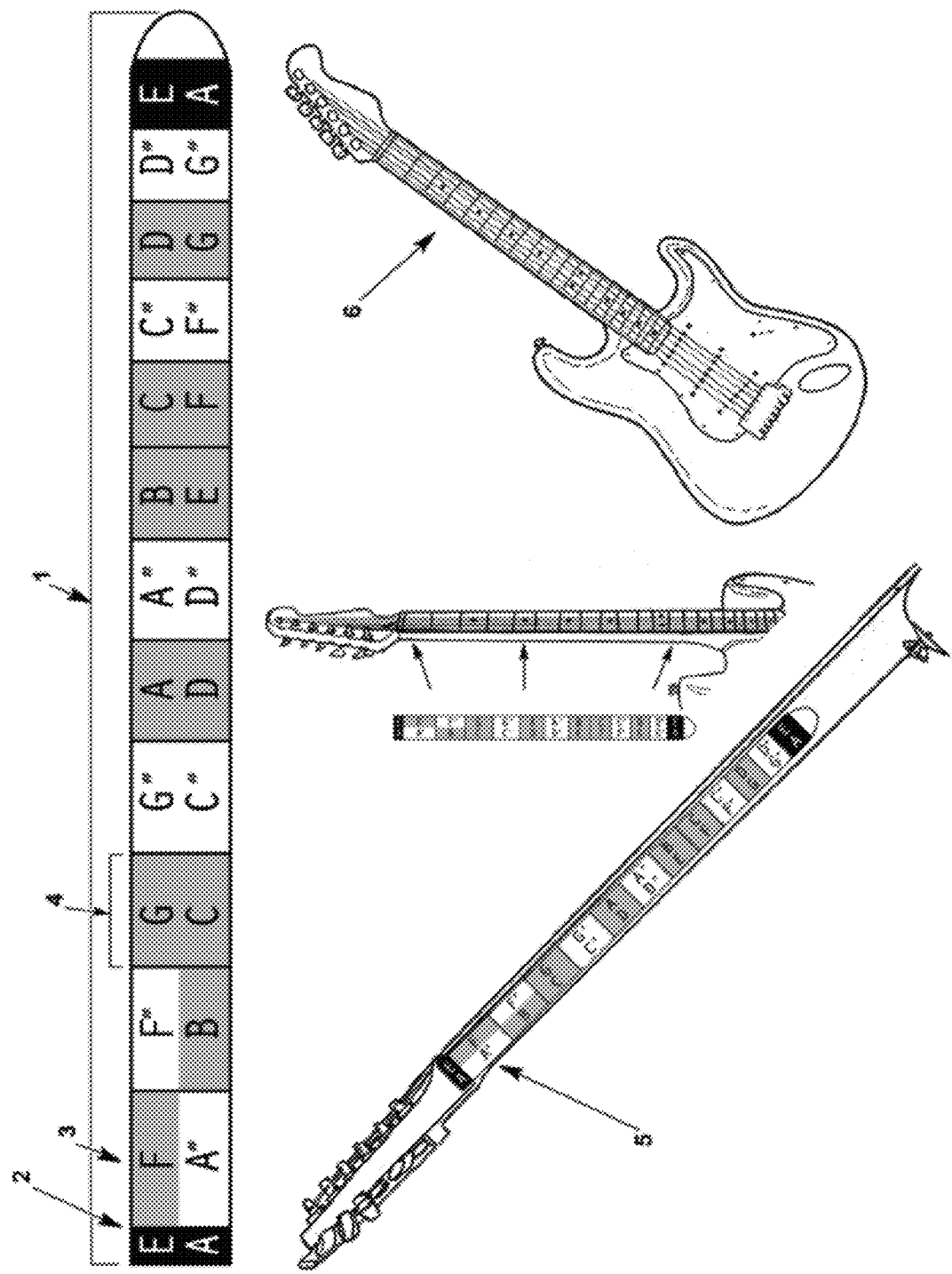
FIG. 1 depicts a preferred embodiment of the invention where the notes/chords for the lowest two strings are shown.

A preferred embodiment of the invention is shown in FIG. 1. A strip, or decal by way of example, 1 is printed with images of musical notes, the notes corresponding to the two lowest pitch strings for a plurality of fingering positions along the fingerboard of a stringed instrument 6. Although the invention is applicable to all stringed instruments, it is most useful applied to fretted instruments such a guitar. So this disclosure will use fingering position and fret interchangeably, but it is to be understood that non-fretted instruments could also benefit from the invention. Musical notes are represented by the first seven letters of the alphabet. In this embodiment the notes represent standard tuning. These notes are printed to be visible over the wooden color of the neck 5 and can be any color easily visible to the player. The decal 1 can be different lengths and widths based on the width and length of the neck 5 of the particular instrument 6.

The strip 1 is preferably placed such that the note corresponding to the lowest pitch string is placed nearest the top of the fingerboard and notes corresponding to the higher pitch strings are placed below the lowest pitch string note more or less in a column as shown. The note columns are located between the frets along the neck 5. In standard tuning, notes will start with E at the top of the neck, or the nut 2. The decal is positioned for the E to represent the lowest pitch string or the E string. This is then repeated to represent the notes corresponding to the frets 3 and so on such as the third fret 4 and then follow along the length of the neck until ending at some point, such as with E on the $12^{th}$ fret as shown by way of example. Any number of frets from one to all could be depicted. In this embodiment. only two notes per column will be present per fret. For example the first lists F, and A#. When barred these notes form the root for the cord. For example the fret listed as F, A# if barred on F will be the root of the F cord. These roots are essential when playing Barre Cords and Power Cords. These two types of cord structures are an integral part of playing guitar. The invention can be used to assist those learning the fret board of the guitar. The Bass fret board is basically the same as a guitar, but longer, and with less strings. The invention can be used to assist those learning the fret board of the bass as well.

Fret placement is known in the art and follows a mathematical formula based on even tempered division of octaves for a given neck length. Thus the width and placement 4 of each column can be derived from known principles By way of example, a specific implementation for a right handed Fender Stratocaster is described:

1. By way of examples a clear plastic vinyl strip ⅝" wide and 14.141" in length 1 is employed.
2. The first two notes represent the guitar in standard tuning, starting with E, and A notes 2. The dark line represents the nut; this is where the strip needs to line up with the nut. This alignment will allow proper spacing of the notes.
3. The letters can be any color printed onto the vinyl plastic strip. The colors need to be bold so they are visible. Blue, Black, Green, and White for black stained necks would be appropriate. In this version the notes are ¼" W, and ⅜" H.
4. Each note is positions between each fret. This is where a bar cord or power cord should be placed to root the cord, in that note. This spacing is as follows for the notes on a Fender Stratocaster.
5. The Figure shows the position of the strip while looking down on the guitar neck 5 during play Because the exemplary strip is made of a clear plastic vinyl, it will stick to the guitar neck without using any adhesive. This will allow the player to easily remove the decal when wanted, without harming the finish of the guitar neck

| Fret Number | Note Spacing, from Nut |
| --- | --- |
| 1 | 2.1465 |
| 2 | 3.4575 |
| 3 | 4.6945 |
| 4 | 5.863 |
| 5 | 6.965 |
| 6 | 8.005 |
| 7 | 8.987 |
| 8 | 9.9135 |
| 9 | 10.789 |
| 10 | 11.6145 |
| 11 | 12.3935 |
| 12 | 13.129 |

Figure 2:
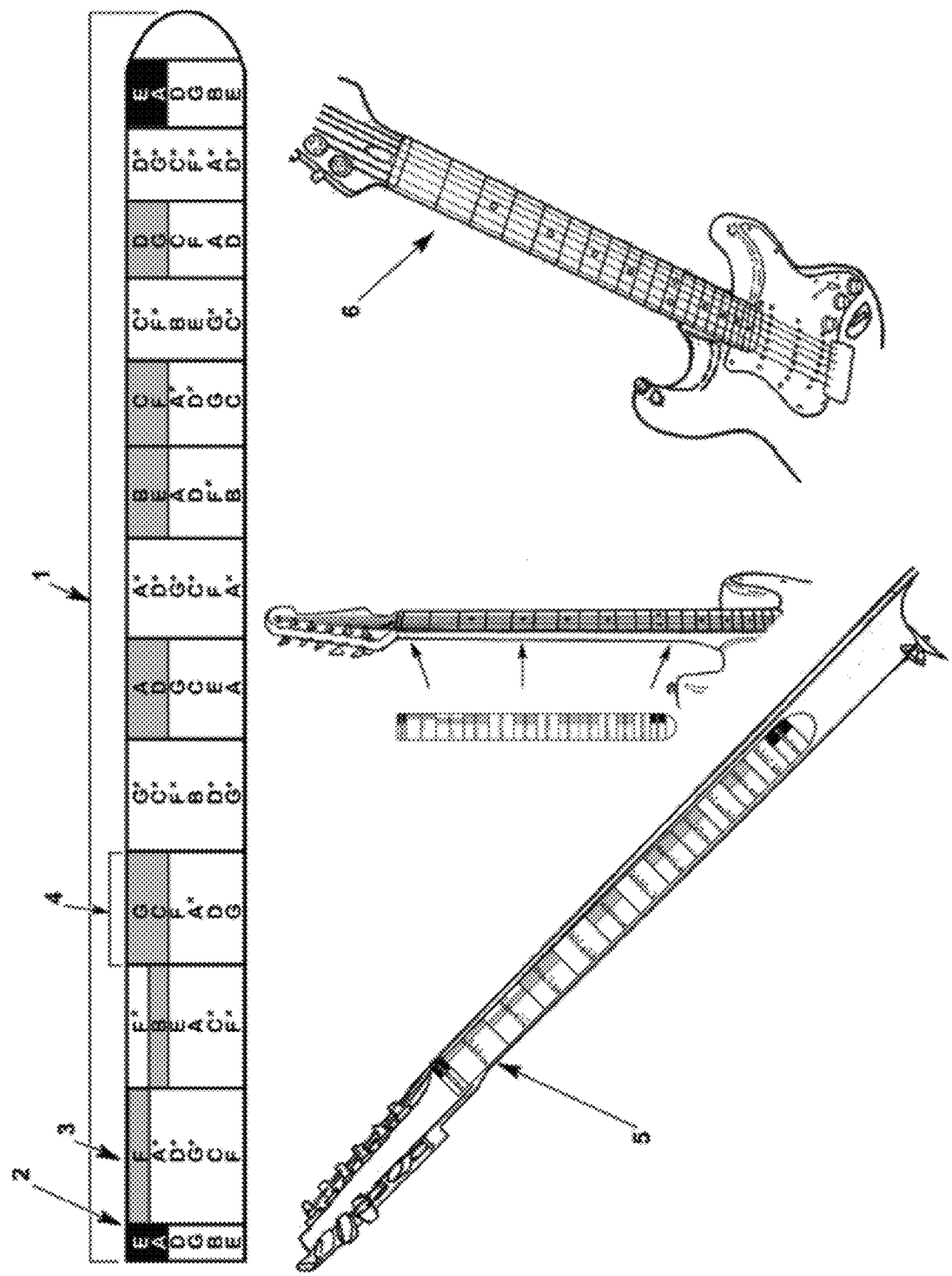
FIG. 2 depicts an alternative embodiment where all the strings are shown.

A variation of the invention is shown in FIG. 2, where instead of just the top two strings depicted (E and A for guitar and bass), all strings are depicted. This embodiment us useful, but the majority of the benefit for simple rock songs is provided by the 2-string embodiment, and the 2-string embodiment is easier to see in normal playing position. The all-string embodiment does still provides advantages over conventional fingerboard solutions. For a Bass, a 4-string version may be employed.

Figure 3:
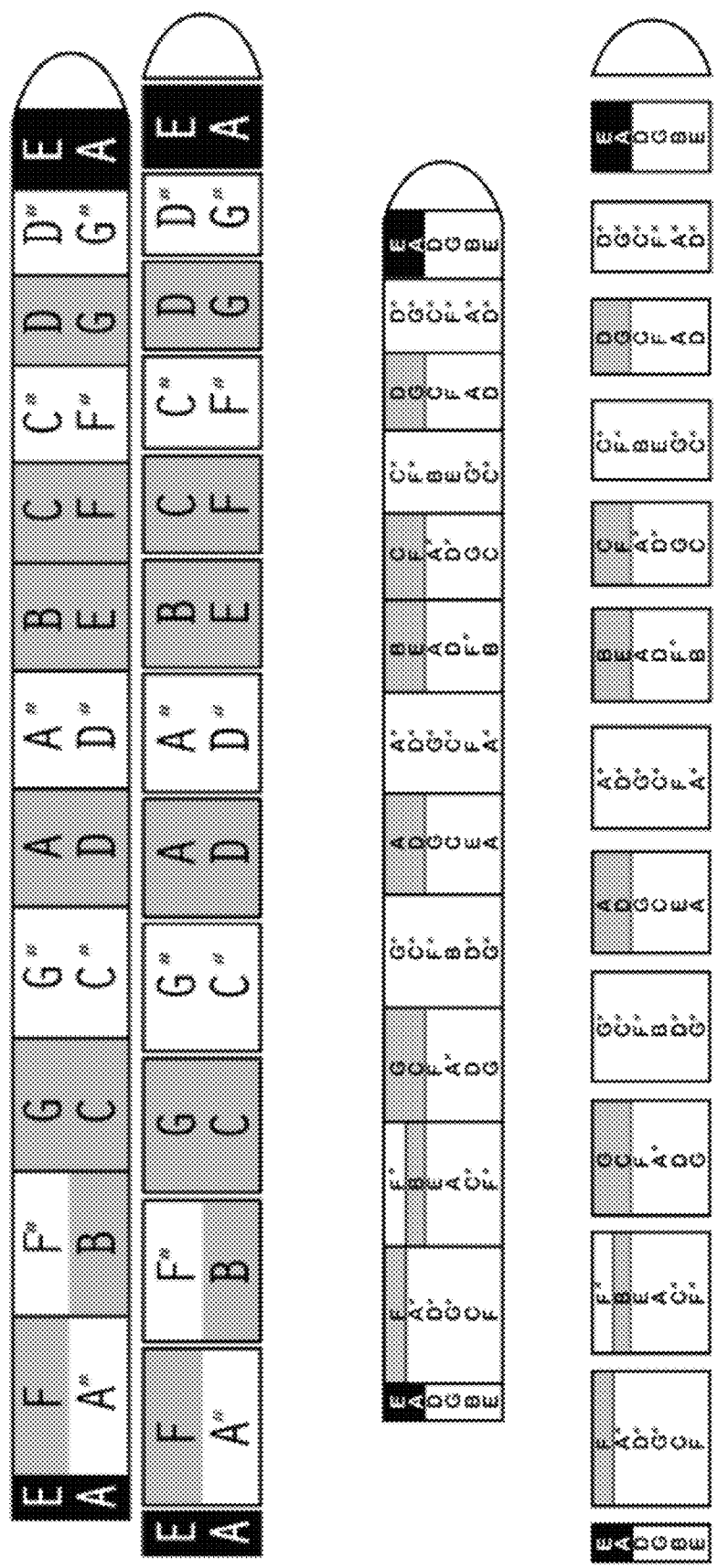
FIG. 3 depicts how both embodiments may be either a continuous strip or individual strips for each fingering position or fret.
Figure 4:
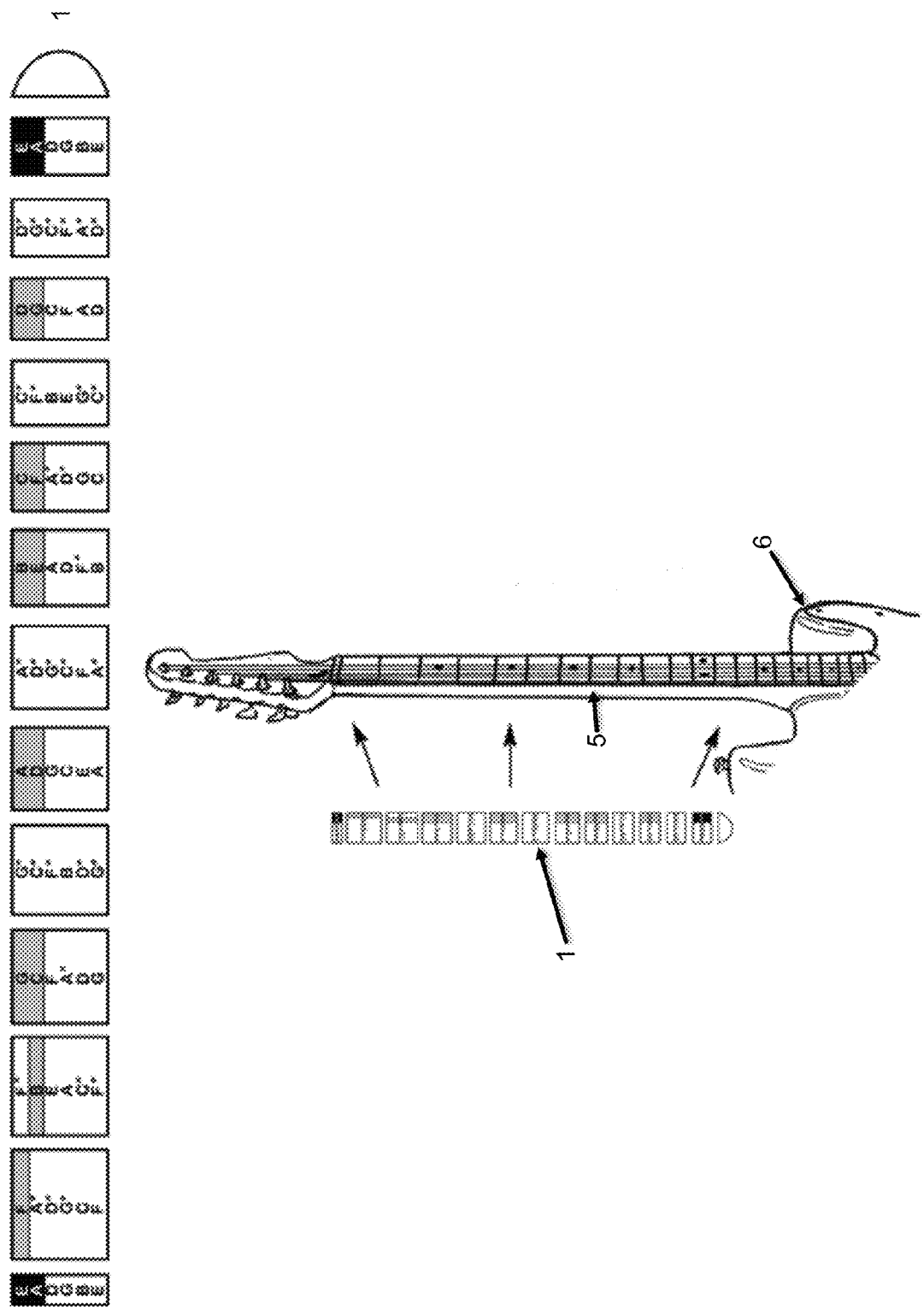
FIG. 4 depicts the use of the invention for the case of individual strips.
Figures 5A, 5B:
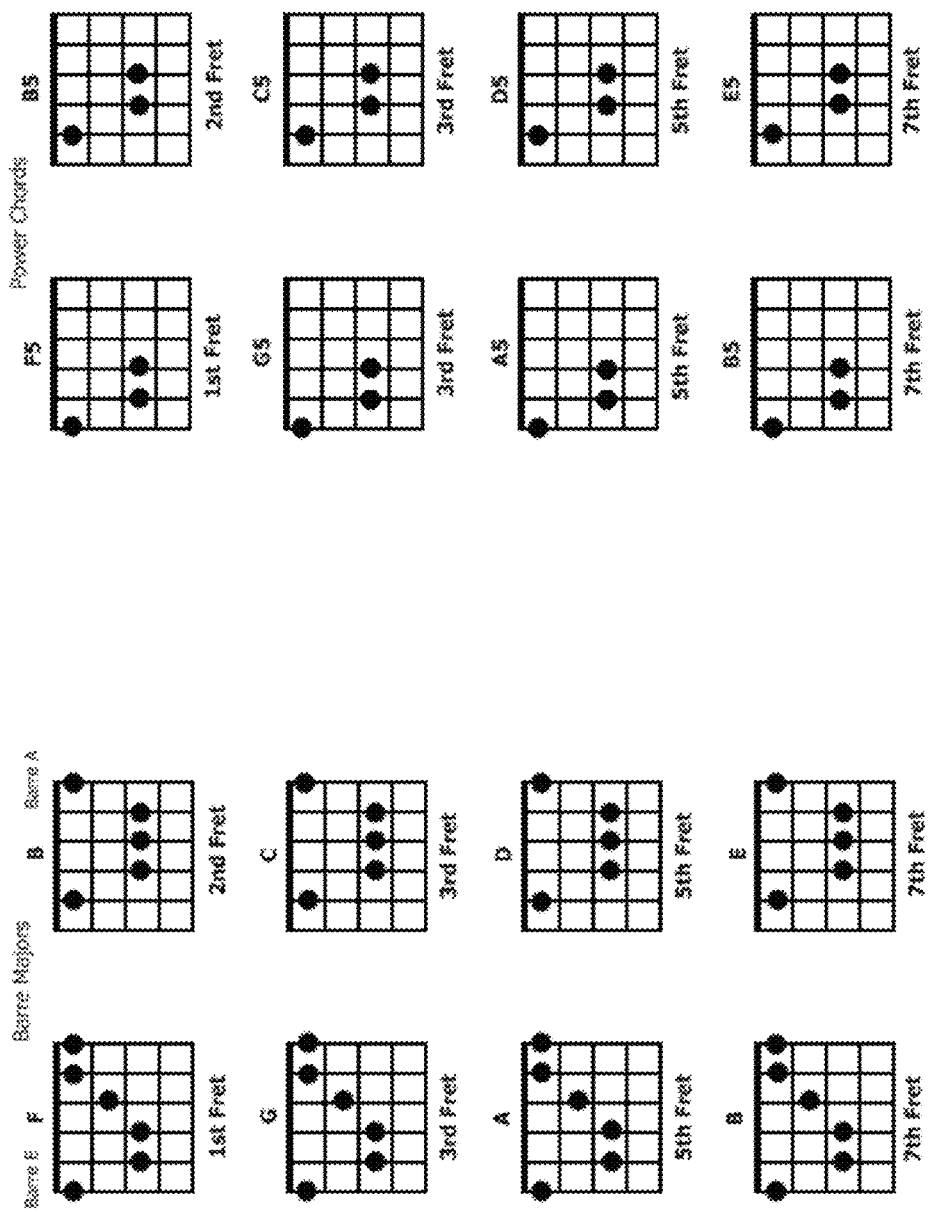
FIGS. 5a and 5b show barrre and power chords for a six-string guitar in standard tuning.

The embodiments of FIGS. 1 and 2 need to be sized specifically for each individual neck size and fret configuration. FIG. 3 shows an alternative embodiment which may be more universal. Instead of a continuous strip a number of sequential individual note column strips (2 and six string versions shown) for a plurality of frets (1-12 shown by way of example) is provided. Preferably instructions would be provided to ensure a player installs the strips in proper order. FIG. 4 depicts the individual strips as they are installed.

The invention also includes a teaching method pertaining to the novel note strip(s). It preferably includes an instruction sheet, and or booklet on printed material or/and a DVD. This will show the player where to place their fingers to form a Barre Chord and a Power Chord. The system will also instruct a Bass player how to play along with a guitarist and play songs. Having this easy reference allows the guitar and bass player to find the notes on the fret board and makes playing easier and more fun. This also allows a beginning bassist and beginning guitarist to play together in tune very quickly.

Many suitable materials for the invention will suggest themselves to one skilled in the art. The inventors have used a clear static-cling vinyl decal, or low tack adhesive vinyl. The adhesive can be manufactured to leave no residue. Polyethylene terephthalate (PET), Application Tape, Surface Protection Tapes, and Polyester are all candidate materials. These implementations are easily removable without damaging the instrument, and are distinct from the sticker implementations employed in fingerboard solutions.

Thus the invention as described has several advantages and points of novelty compared to existing solutions. First the invention is easy to install and remove, not requiring the removal of strings. Second the positioning of the invention makes it much easier to see in normal playing positions compared to fingerboard solutions while providing more complete and beginner-friendly information than other neck based solutions. Third the invention will not be obvious to observers of the player as it is positioned away from the front of the instrument. Fourth, in its most basic form it provides a very easy to learn and play system for beginning guitar players to play barre, and power chords. Fifth, when applied to both guitar and bass, it gives the beginning bassist and guitarist an easy reference point, allowing for fast and easy group playing.

The invention also is a teaching method based on the novel guitar notes strip as a reference tool. The following description will focus on a six-string electric guitar in standard tuning with right handed play. However other configurations of fretted instruments also may benefit from the concepts of the novel teaching method. The steps of the method are:
1. Placing the strip on the neck of the guitar as described bove.
2. Holding guitar with left hand and strings faced away from the player, the top E string should be closest to the players chin. This allows the player an easy reference for the notes.
3. Option 1: Use the reference tool, to learn root notes: Root notes are used in all chords, and scales. The device will allow the player to easily reference all 12 notes, for each string. A, A#, B, C, C#, D, D#, E, F, F#, G, G#. These notes are the root notes for Barre chords, Power chords, and scales. To start a player can just use the index finger to play the notes. One embodiment allows reference for the fist two strings, or the E, and A.
4. Learning basic songs just using the index finger and the E and A strings. Such as Mary had a little lamb. EDCD, EEE, DDD, EGG-EDCD, EEE, DDED, C
5. Option 2: Learning Bass: Because chords are rarely used in novice playing bass, beginning Bass players can learn the fundamentals of bass directly with the reference tool. Simple songs can be played together with Bass and Guitar using this method.
6. Option3; Creating (2 note pattern) Power Chords: Using the ring finger, placed on the string below the root, and on the 2nd fret down, allows the player to play a Power Chord.
7. Option 4: Creating (3 note pattern) Power Chords. Using the pinky, placed on second string below the root, and on the same fret as the ring finger allows the player to play a 3 note power chord. These chords can be used to play all major and minor notes on the guitar.
8. Option 4: Using these same finger patterns to learn Barre E Chords. Pinching the neck between the index finger and the thumb, then placing middle finger on the third string below the root, and on the next fret down allows the player to play a Barre E chord. See an example of an F chord in the image below:
9. Option 4: Using these same finger patterns to form Barre A Chords. Moving the root index finger down one string to the A string, and pinching the neck between the index finger and the thumb, use the same pattern learned above, just move the middle finger to the second fret below the root. This allows the player to play a Barre A chord form. Barre A chords forms can also be played using only the index finger, and the ring finger. In this case the ring finger covers all the strings on the second fret below the root.
10. Putting these Barre chords together allows the player to play all 7 of the major chords on the guitar. With only two fingering patterns, and little action (action is the moving up and down the fret board). With a couple of simple modifications such minor and $7^{th}$ variations, a beginning player can very quickly learn 48 chords up to the $7^{th}$ fret. Using the entire fret board a beginning player can very quickly learn over a hundred chord positions.
13 Option 5: Learning Scales: Root notes are used in scales just as they are used in Barre Chords, and Power Chords. The root note identifies the key of the scale. For example the major scale played in the key of C is played on the $5^{th}$ fret using C on the E string, $8^{th}$ fret, as the root note. A minor scale played in C is played on $8^{th}$ fret using C on the E string, $5^{th}$ fret, as the root note. The reference tool will help a player easily reference the root note for any scale.

Using the reference tool in a teaching message, can allow a beginning player to learn guitar quickly, and easily. Root notes are the foundation to all music, learning these root notes first and how to apply them to form barre chords, power chords and scales, allows the player to understand what they are playing vs just playing open chords.

Alternative embodiments are also within the scope of the invention. For instance the device can be very helpful, even for experienced players to keep track of where they are notewise on the fingerboard in non-standard tunings such as the various slack-key tunings. Special versions of the strip for non-standard tunings would have great utility. Also, the invention applies advantageously for other instruments such as ukulele, mandolin and banjo. Ukulele for instance has the same tuning pattern as the lowest pitch four strings on a guitar, but the open notes aren't the same. Thus guitar chord patterns work on a ukulele, but the root notes are different. Thus the note reference strip with ukulele root notes could immediately allow a guitar player to be proficient on ukulele the first time he picks one up.

The foregoing description of the embodiments of the present invention has shown, described and pointed out the fundamental novel features of the invention. It will be understood that various omissions, substitutions, and changes in the form of the detail of the systems and methods as illustrated

We claim:

1. A learning and playing system for stringed instruments having a neck and a fingerboard, comprising;
   - a thin flexible strip with characters representing musical notes printed on a surface of the strip, configured for semi-permanent placement along the length of the instruments neck adjacent the fingerboard, wherein
   - notes are printed on the surface corresponding to at least the two lowest pitch strings, starting from the lowest pitch string, or string closest to the player (top of the fingerboard) and corresponding to at least one fingering position, and ordered with the note corresponding to the top string at the top and the notes corresponding to successive strings substantially in a column below starting string note, and;
   - the strip is placed at the fingering position with the top note adjacent to the intersection of the top of the neck and fingerboard, the first end of the strip adjacent to the nut, the strip visible . . . to the player from above and behind the fingerboard, providing a clear indication of the notes for at least the two lowest pitch strings at the fingering position.

2. The system of claim 1 further comprising notes printed on the strip continuously corresponding to a plurality of fingering positions, wherein installing the strip on the neck starting at the lowest fingering position of the plurality provides an indication of the notes at each fingering position of the plurality.

3. The system of claim 1 further comprising a plurality of individual strips corresponding to a plurality of fingering positions wherein installing the individual strips at the corresponding fingering positions provides an indication of the notes at each fingering position of the plurality.

4. The system of claim 1 wherein the column of notes includes notes for all the strings on the instrument.

5. The system of claim 1 wherein the fingering positions correspond to the frets of a fretted instrument.

6. The system of claim 1 wherein the strip is a decal attaching to the neck with by least one of statically or low tack adhesive.

7. The system of claim 1 wherein the instrument is one of;
   guitar,
   bass,
   ukulele,
   mandolin,
   banjo.

8. A method of preparing a stringed musical instrument for teaching or learning, the method comprising
   providing a thin flexible strip with characters representing musical notes printed on a surface of the strip, configured for semi-permanent placement along the length of the instrument's neck adjacent the fingerboard, wherein
   notes are printed on the surface corresponding to at least the two lowest pitch strings, starting from the lowest pitch string, or string closest to the player (top of the fingerboard) and corresponding to at least one fingering position, and ordered with the note corresponding to the top string at the top and the notes corresponding to successive strings substantially in a column below starting string note, and;
   placing the strip at the fingering position with the top note adjacent to the intersection of the top of the neck and fingerboard, the first end of the strip adjacent to the nut, the strip visible to the player from above and behind the fingerboard, providing a clear indication of the notes for at least the two lowest pitch strings at the fingering position.

9. The method of claim 8, where the stringed musical instrument is supported with the back toward the body of the player and the note symbols on the strip are visible as a reference tool to the player, where the user need not look down on the fingerboard, for learning at least one of:
   single root notes,
   basic songs,
   two-note power chords,
   three-note power chords,
   E-barre chords,
   A-barre chords,
   scales.

* * * * *